United States Patent
Saigh (10) Patent No.: US 8,215,178 B2
(45) Date of Patent: Jul. 10, 2012

(54) SENSOR DEVICE TO MONITOR DEFORMATION IN STRUCTURAL MEMBERS, SUCH AS SOLID STRUCTURES

(75) Inventor: Fathi Saigh, Laval (CA)

(73) Assignee: Flexco Industries Inc., Montreal (CA)

( * ) Notice: Subject to any disclaimer, the term of this patent is extended or adjusted under 35 U.S.C. 154(b) by 311 days.

(21) Appl. No.: 12/598,122

(22) PCT Filed: May 2, 2008

(86) PCT No.: PCT/CA2008/000845
§ 371 (c)(1),
(2), (4) Date: Oct. 29, 2009

(87) PCT Pub. No.: WO2008/134877
PCT Pub. Date: Nov. 13, 2008

(65) Prior Publication Data
US 2010/0175484 A1    Jul. 15, 2010

Related U.S. Application Data

(60) Provisional application No. 60/915,488, filed on May 2, 2007.

(51) Int. Cl.
*G01B 7/16* (2006.01)
(52) U.S. Cl. .......................................................... 73/775
(58) Field of Classification Search ................... 73/760, 73/762, 775, 776
See application file for complete search history.

(56) References Cited

U.S. PATENT DOCUMENTS

| | | | |
|---|---|---|---|
| 3,599,139 A | 8/1971 | Low | |
| 4,336,595 A | 6/1982 | Adams et al. | |
| 4,503,705 A * | 3/1985 | Polchaninoff | 73/172 |
| 4,557,150 A * | 12/1985 | Utsunomiya | 73/862.627 |
| 4,904,222 A * | 2/1990 | Gastgeb et al. | 446/405 |
| 5,192,938 A | 3/1993 | Ort | |
| 5,991,049 A * | 11/1999 | Tanaka et al. | 356/445 |
| 6,175,752 B1 * | 1/2001 | Say et al. | 600/345 |
| 6,689,948 B2 * | 2/2004 | Raisanen | 84/733 |
| 6,941,162 B2 * | 9/2005 | Fudge et al. | 600/344 |
| 6,977,592 B2 * | 12/2005 | Orlewski | 340/667 |
| 7,264,194 B2 * | 9/2007 | Gassner et al. | 242/555.3 |
| 7,339,490 B2 * | 3/2008 | Moore et al. | 340/693.5 |
| 7,591,792 B2 * | 9/2009 | Bouton | 600/587 |

FOREIGN PATENT DOCUMENTS

| | | |
|---|---|---|
| CA | 2163653 | 12/1994 |
| JP | 02247054 A | 10/1990 |
| JP | 10176964 A | 6/1998 |

OTHER PUBLICATIONS

Vishay Micro-Measurements, Instruction Bulletin B-127-14, "Strain Gage Installations with M-Bond 200 Adhesive." Document No. 11127, Rev. 17, Jan. 2005.
International Search Report, PCT/CA2008/000845, Jul. 17, 2008.

* cited by examiner

*Primary Examiner* — Max Noori
(74) *Attorney, Agent, or Firm* — Norton Rose Canada LLP (57) ABSTRACT

A sensor device comprises a sensing component adapted to be connected to a monitoring system to send signals associated with deformation of a structural member. An adhesive is adapted to bond the sensing component to a surface of a structural member. A tape has at least one adhesive surface adapted to be adhered to the surface of a structural member to be monitored, with the sensing component being positioned between the tape and the surface of the structural member. The sensor device is used in combination with a monitoring system.

19 Claims, 8 Drawing Sheets

SENSOR DEVICE TO MONITOR DEFORMATION IN STRUCTURAL MEMBERS, SUCH AS SOLID STRUCTURES

CROSS-REFERENCE TO RELATED APPLICATION

The present patent application claims priority on U.S. Provisional Patent Application No. 60/915,488, filed on May 2, 2007.

FIELD OF THE APPLICATION

The present application generally relates to sensors used on structures to monitor, particularly but not exclusively, deformation resulting from, for example, deflection, load, pressure or tilt.

BACKGROUND OF THE ART

Sensors of all types are installed on structures to measure parameters such as deformation and tilt, resulting from a plurality of internal factors, e.g., material quality, foundations, and external factors, e.g., wind, temperature variations, earthquakes, landslides, ice and snow build-up, load build-up, pressure.

For instance, to perform material handling in warehouses, fork lift vehicles are often used. For lifts have forks that are used to lift loads. The forks are mounted to vertically-extending mast. One of the issues with such fork lift vehicle is that they may become unstable when supporting loads with the mast being extended. Another issue is when the center of mass of the load is not centered on the forks (e.g., the load is toward the tip of the forks). More specifically, by a relatively heavy load being lifted has the effect of varying the center of mass of the fork lift, hence increasing the risk of a tipping over of the fork lift and its load.

The sensors are provided to ensure the safety of occupants or users of the structures, by monitoring unusual variations in the above-described parameters, which could cause severe damage. Such monitoring would indicate when corrective action needs to be taken to prevent failure of such monitored structures.

One of the issues with existing sensors is that a non-negligible amount of work is required to install such sensors. In many cases, there are access issues pertaining to the installation of the sensors. For instance, it may be required to position sensors in remote locations, whereby it is desirable that the installation steps are readily performed.

SUMMARY OF THE APPLICATION

It is an aim of the present application to provide a novel sensor device to monitor a level of deformation of surfaces.

Therefore, in accordance with the present application, there is provided a sensor device comprising: a sensing component adapted to be connected to a monitoring system to send signals associated with deformation of a structural member; an adhesive adapted to bond the sensing component to a surface of a structural member; and a tape having at least one adhesive surface adapted to be adhered to the surface of a structural member to be monitored, with the sensing component being positioned between the tape and the surface of the structural member.

Further in accordance with the present application, the tape has two said adhesive surface, with a first one of the adhesive surface adapted to adhere to the surface of the structural member, and a second one of the adhesive surfaces adapted to adherently support components associated with the sensing components.

Further in accordance with the present application, a structural component is adhered to the second one of the adhesive surfaces so as to support components associated with the sensing components for interface with a monitoring system.

Further in accordance with the present application, a structural component is connected to the tape so as to support components associated with the sensing components for interface with a monitoring system.

Further in accordance with the present application, the structural component is a casing accommodating the components associated with the sensing components for interface with a monitoring system.

Further in accordance with the present application, the casing has a rounded geometry, such that the sensor device is adapted to be mounted against a rounded surface of the structural member.

Further in accordance with the present application, the casing has a standard wall-mount telephone jack associated with the sensing component so as to be adapted to receive a telephone plug from the monitoring system, and the tape has two said adhesive surface, with a first one of the adhesive surface adapted to adhere to the surface of the structural member, and a second one of the adhesive surfaces adapted to adherently support the standard wall-mount telephone jack.

Further in accordance with the present application, the sensing component is at least one foil strain gage.

Further in accordance with the present application, four of said foil strain gauge arranged in a wheatstone bridge.

Further in accordance with the present application, a backing sheet is temporarily connected to an exposed one of the at least one adhesive surface to protect the adhesive surface and the sensing component prior to installation.

Further in accordance with the present application, an interface component is provided on the structural component, the interface component being connected to the sensing components for interface with a monitoring system.

Further in accordance with the present application, holes are in register in the structural component and the tape for lead wires of the sensing component to pass therethrough.

Further in accordance with the present application, the structural component has a built-on reservoir dispensing said adhesive.

Further in accordance with the present application, the structural component has a grinding surface to clean the surface of the structural member.

Further in accordance with the present application, the structural component encloses a wet cloth to clean the surface of the structural member and the sensing component.

In accordance with another embodiment of the present application, there is provided a sensor device and monitoring system combination comprising: at least one sensor device having a sensing component adapted to be bonded to a surface of a structural member; and a tape having at least one adhesive surface adapted to be adhered to the surface of a structural member to be monitored, with the sensing component being positioned between the tape and the surface of the structural member; and a monitoring system connected to the sensor device to receive signals associated with a deformation of a structural member, the monitoring system comprising a signal interpreter to produce a value associated to said deformation, and an interface to produce a user output with said value.

Further in accordance with the present application, the interface is a display unit displaying a numerical value as said user output associated to said deformation.

Further in accordance with the present application, the interface is an alarm indicating that said value is above a given threshold.

Further in accordance with the present application, the sensor device further comprises a transmitter and the monitoring system comprises a receiver for wireless communication between the sensor device and the transmitter.

Further in accordance with the present application, the sensor device and transmitter have a rechargeable power source.

Further in accordance with the present application, two of said sensor device for one said monitoring system.

Further in accordance with the present application, a limit switch is connected to the monitoring system, the limit switch being triggered to activate a threshold, with the signal interpreter comparing the threshold to said value associated to said deformation.

DESCRIPTION OF PREFERRED EMBODIMENTS

Figure 1:
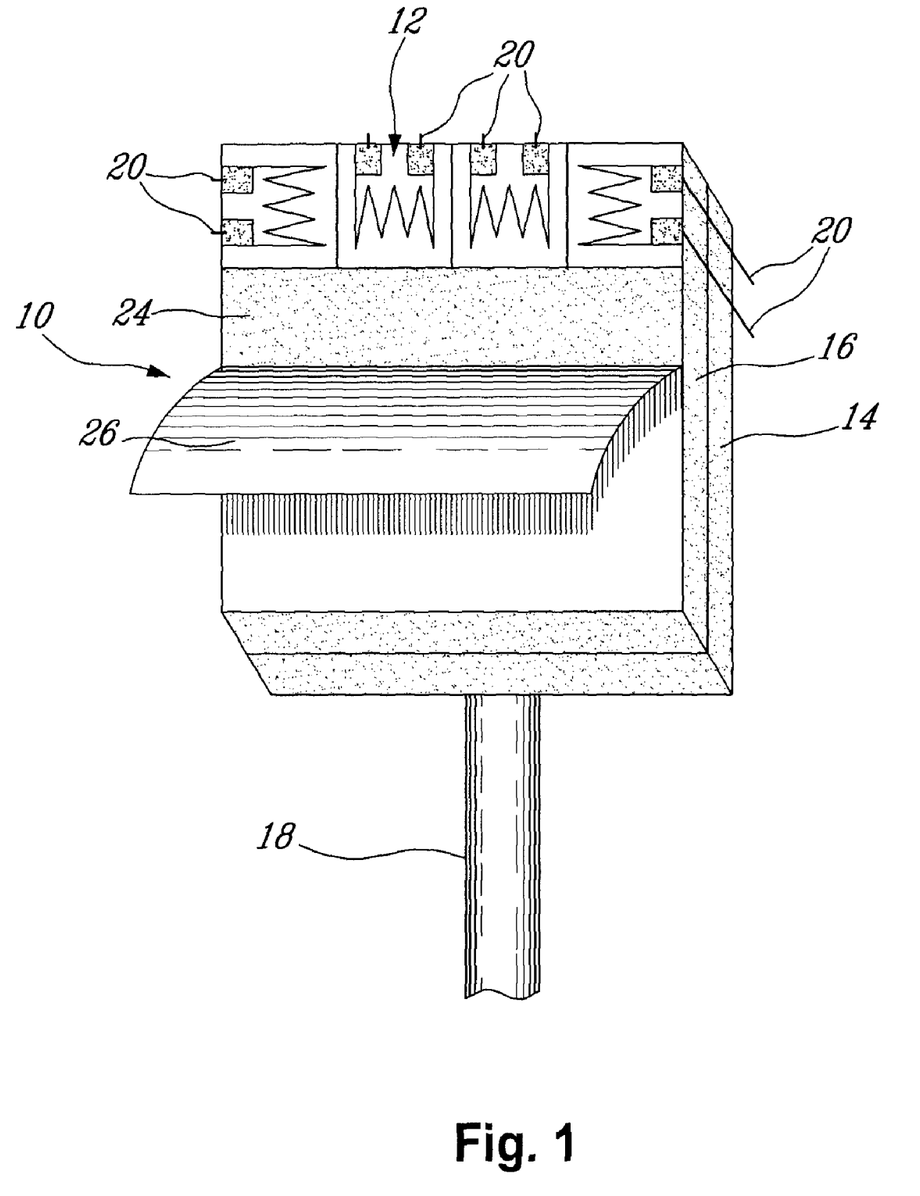
FIG. 1 is a perspective view of a sensor device in accordance with an embodiment of the present disclosure, with a backing sheet partially removed.

Referring now to the drawings, and more particularly to FIG. 1, a sensor device in accordance with an embodiment is generally shown at 10. The sensor device 10 has sensing components 12, a structural component 14, a securing component 16 and an interface component 18.

The sensing components 12 are provided to monitor a structural member such as solid structure or parts of a mechanism with regard to the load or pressure it sustains, or its level of deformation.

The structural component 14 is provided to support the sensing components 12 and other accessories while the sensing components 12 perform their task of monitoring load, pressure, deformation or the like.

The securing component 16 is used to secure the sensor device 10 to a surface to be monitored. The securing component 16 also interconnects the sensing components 12 to the structural component 14.

The interface component 18 is the interface between the sensor device 10 and a control system, a monitoring system or the like, that will actuate the sensing components and receive their signals to calculate the level of deformation of the structural member being monitored.

Figure 2:
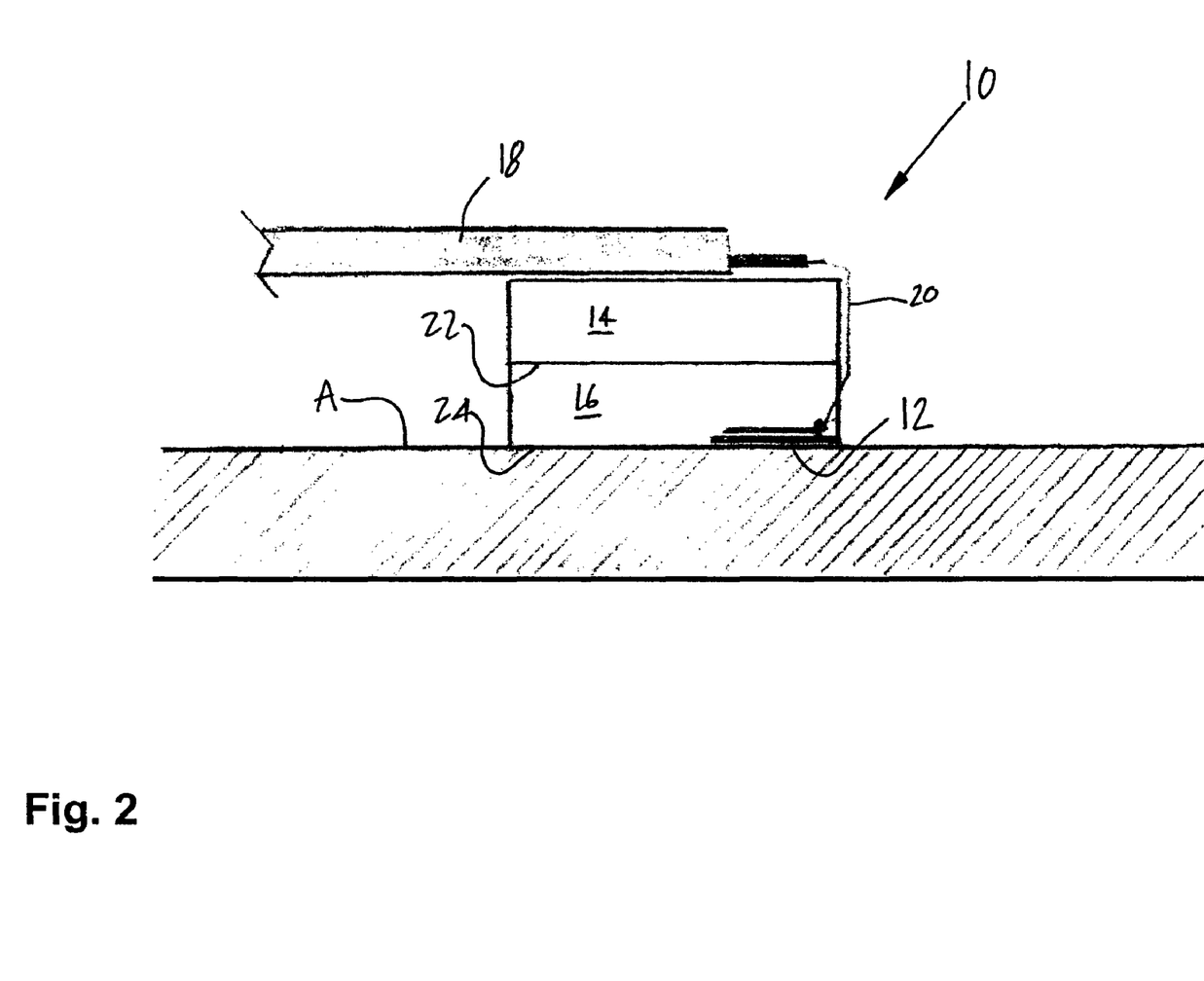
FIG. 2 is a side view of the sensor device of FIG. 1, as mounted to a structural member having a flat surface.

Referring concurrently to FIGS. 1 and 2, the sensing components 12 are illustrated as being four strain gages or like semi-conductors, oriented so as to detect load, pressure, deformations along different orientations. In an embodiment, the strain gages are foil strain gages having both a conductive and a non-conductive side, and arranged in a wheatstone bridge configuration. The non-conductive side of the strain gages is exposed, as it faces away from the structural component 14.

Lead wires 20 of the strain gages are connected to the interface component 18, as is visible in FIG. 2, whereby the strain gages are connected to a sensor monitoring system. It is pointed out that the strain gages are secured to the securing component 16 with the side from which extend the lead wires 20 being against the securing component 16.

In the embodiment of FIGS. 1 and 2, the structural component 14 is a rigid plate having a generally flat surface 22. The securing component 16 is an adhesive tape, such as a double-sided tape, having its first surface adhered to the flat surface 22 of the rigid plate. As shown in FIG. 1, the second surface 24 of the double-sided tape is oriented away from the flat surface 22, and is covered by backing sheet 26 to preserve its adherence properties before the securing of the sensor device 10 to a surface of a structural member to be monitored.

The strain gages are adhesively stuck to the second surface 24 of the tape, and the adhesive of the tape is sufficient to maintain the strain gages in a desired position and orientation on the tape. As the surface supporting the lead wires 20 of the strain gages is against the second surface 24 of the tape, it is desired to select a tape as well as a structural component 14 that have insulating properties.

As is shown in FIG. 2, the sensor device 10 is secured to a surface A of a structural member to be monitored by adhering the second surface 24 of the securing component 16 (i.e., double-sided tape) to the surface A, with the backing sheet 26 having been removed beforehand. Accordingly, when the sensor device 10 is secured to the surface A, the sensing components 12, namely the strain gages, are coplanar with the surface A, with the conductive surface or the surface supporting the lead wires 20 of the strain gages oriented away from the surface A. A portion of the second surface 24 of the securing component 16 cooperates with the surface A so as to secure the sensor device 10 to the surface A, while supporting the strain gages 12.

The installation of the sensor device 10 and all other embodiments thereof is readily performed by primarily adding some adhesive to the exposed surface of the strain gages 12, and then by sticking the sensor device 10 via its surface 24 to the selected surface of the structural member to be monitored. The adhesive added to the exposed surface of the strain gages 12 will cause the strain gages 12 to bond to the surface of the structural member or solid structure to monitor. This anchoring allows the strain gages 12 to detect strain sustained by the structural member or structure as a result of pressure, load, deformation. The strain gages are activated and monitored by way of the interface component 18, and a deformation of the surface A will be signaled to a sensor monitoring system.

Figure 3:
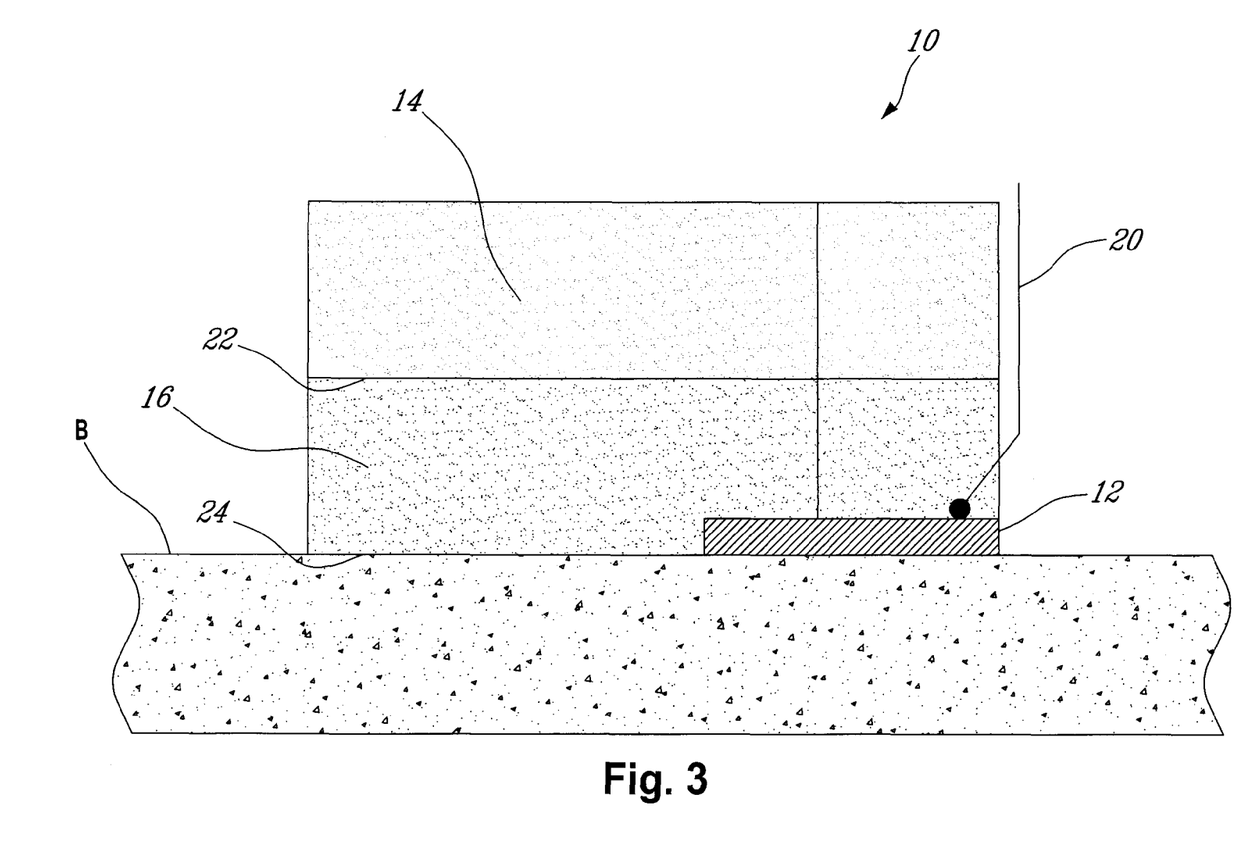
FIG. 3 is a side view of the sensor device of FIG. 1, as mounted to a structural member of porous material.

The sensor device 10 can suitably be used to monitor deformations of porous materials. Referring to FIG. 3, the sensor device 10 is shown being used on the surface B of a porous material, with the liquid adhesive curing to fill the pores of the porous material and bonding the sensing components 12 to the surface B. Accordingly, the sensor device 10 can be used to monitor deformations of materials such as asphalt and concrete.

Figure 4:
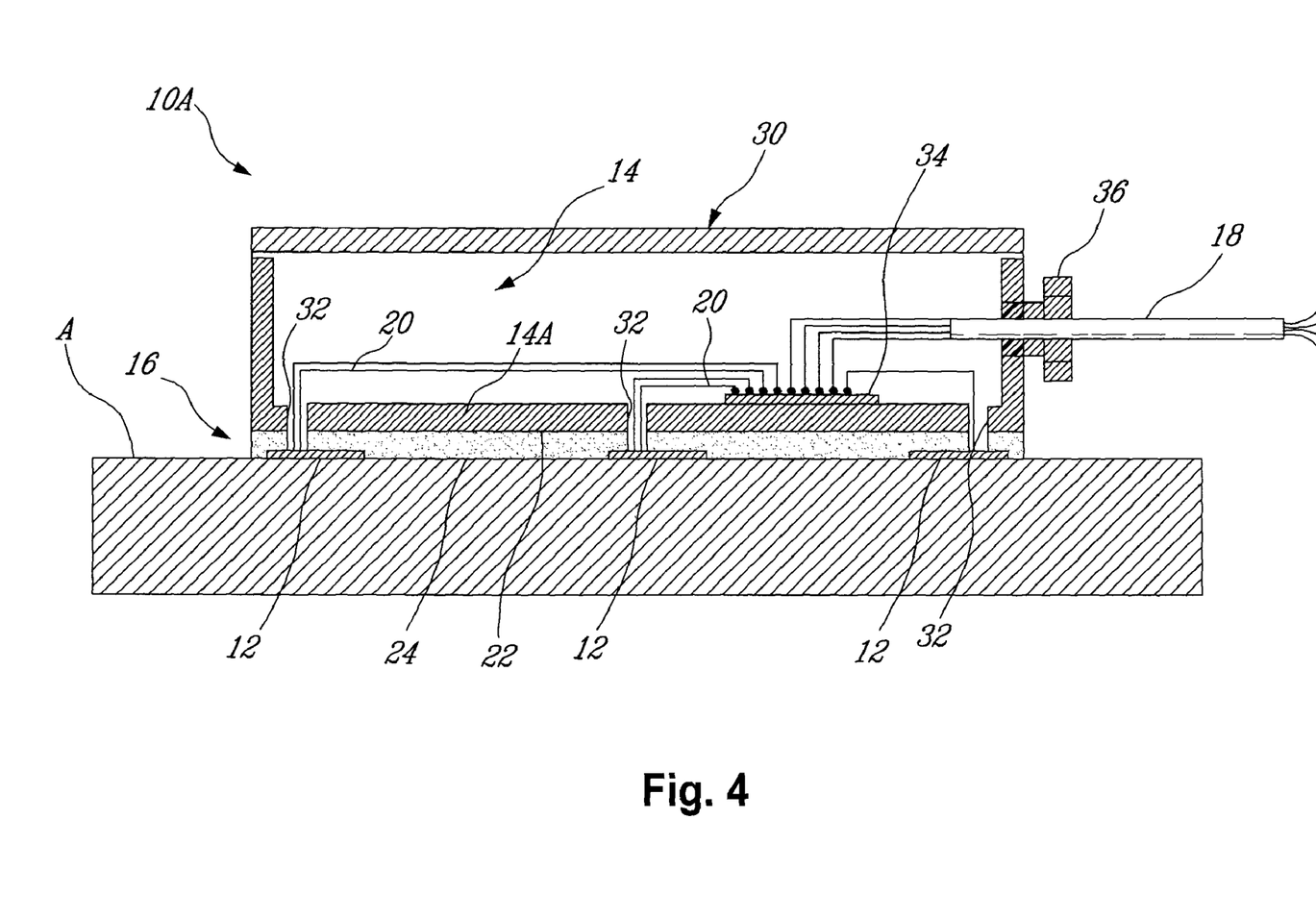
FIG. 4 is a sectional view of a sensor device in accordance with another embodiment, with a structural component being a casing.

Referring to FIG. 4, the sensor device 10A is shown according to another embodiment. In the sensor device 10A of FIG. 4, the structural component is a casing 30. The casing 30 accommodates an interface between the lead wires of the strain gages 12 and the cable 18.

More particularly, the sensor device 10A has strain gages 12 spread on the second surface 24 of the double-sided adhesive tape 16. Openings 32 are defined through the tape 16 and rigid wall 14A of the casing 30. The lead wires of each strain gage pass through a respective opening 32 to reach the interface circuit 34 (or like connector), to be connected with related wires from cable 18 (i.e., the interface component). A connector 36 is provided at the junction of the cable 18 to the casing 30, to secure the cable 18 to the casing 30. In an embodiment, the connector 36 is screwed inwardly to apply pressure on the cable 18.

Figure 6:
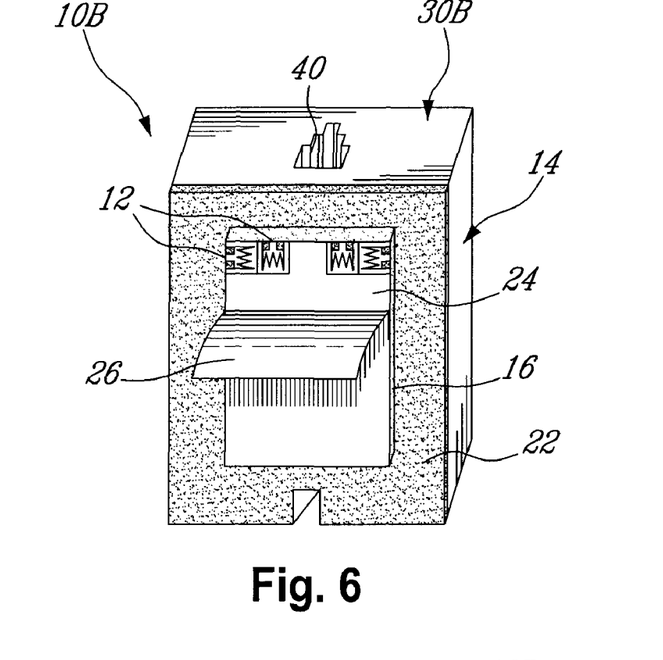
FIG. 6 is a perspective view of a sensor device in accordance with another embodiment, in which the structural component is a standard wall-mount telephone jack.

In FIG. 6, an embodiment similar to the embodiment of the casing 30 is shown, but using a standard telephone jack 30B (e.g., RJ11, RJ14, RJ25 and the like), in which the interface component connects to a female plug 40. The sensor 10B of FIG. 6 involves minimal installation time, as the connection of the sensor device 10B simply requires the insertion of a male plug (not shown) into the female plug 40.

Figure 5:
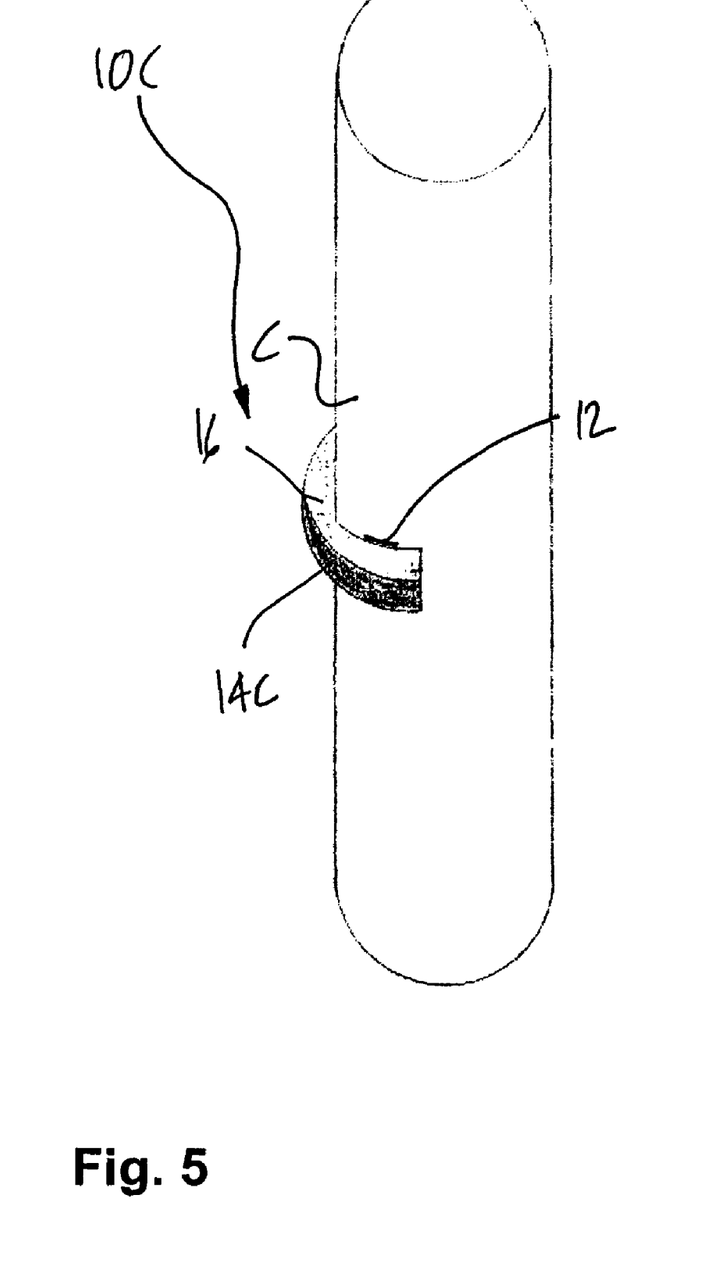
FIG. 5 is a perspective view of a sensor device in accordance with another embodiment, as mounted to a cylindrical structural member.

It is observed that the sensor device may be adapted for use with structural members that do not necessarily have flat surfaces. Referring to FIG. 5, another embodiment of the sensor device is illustrated at 10C as used to monitor deformation in a structural member having a generally cylindrical shape. The sensor device 10C has an arcuate structural component 14C that essentially matches the shape of the surface C of the cylindrical structural member. The double-sided tape 16 and the strain gages (one of which is shown at 12) are made of flexible material, whereby they will both be match the shape of the surface C.

Figure 7:
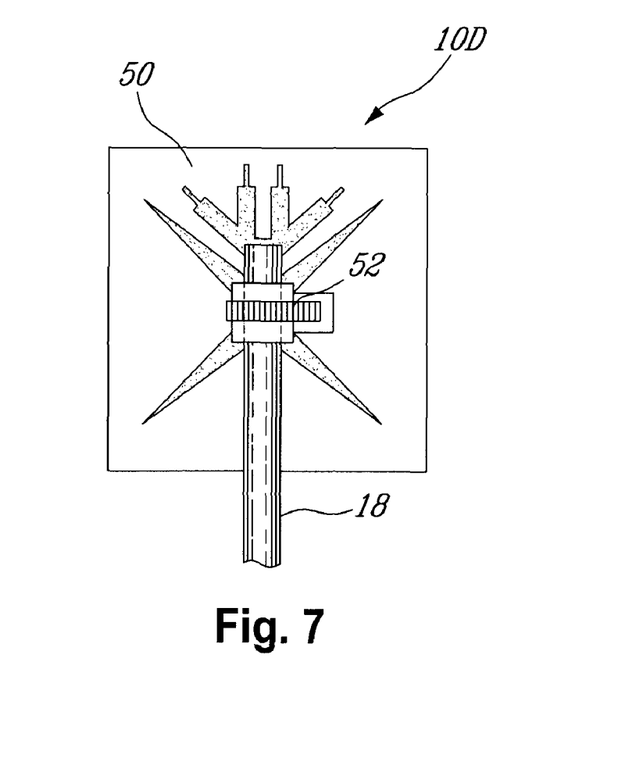
FIG. 7 is a top view of a sensor device in accordance with another embodiment, in which the structural component is a plastic holder for cables.
Figure 8:
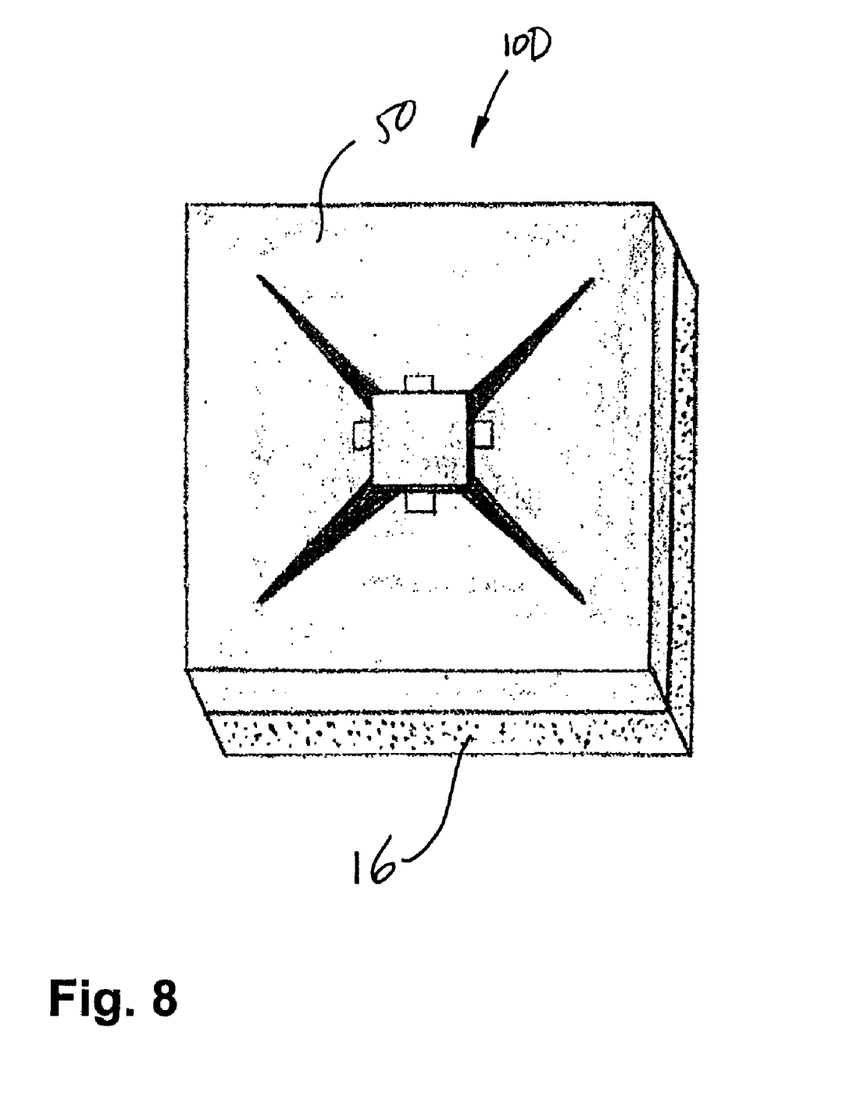
FIG. 8 is a perspective view of the sensor device of FIG. 7, not yet connected by cable.

Referring to FIG. 7, the sensor device is shown at 10D as featuring a typical wall-mount flat plastic holder 50, with the plastic holder 50 being used as structural component. A tie wrap 52 is used to secure the free end of the cable 18 to the sensor device 10D. The wall-mount flat plastic holder 50 is illustrated without the cable 18 is FIG. 8. It is seen that the securing component 16 in the form of tape is used.

Other non-illustrated features may be provided in any embodiment of the sensor device 10, 10A-10D. For instance, the sensor device 10 may have a built-in reservoir to dispense liquid adhesive that will be used to bond the sensing components 12 to the surface A of the object to be monitored. Moreover, the structural component 14 may support sandpaper or like grinding surface to clean a surface to which the sensor device 10 will be connected. Finally, as another alternative, the sensor device 10 may feature a wet cloth, again to clean a surface to which the sensor device 10 will be connected, and to clean the sensing components 12.

Also, the sensor device 10 may be used to activate a relay, a light, produce a signal or an alarm, with such components being optionally an inclusive part of the sensor device 10.

Figure 9:
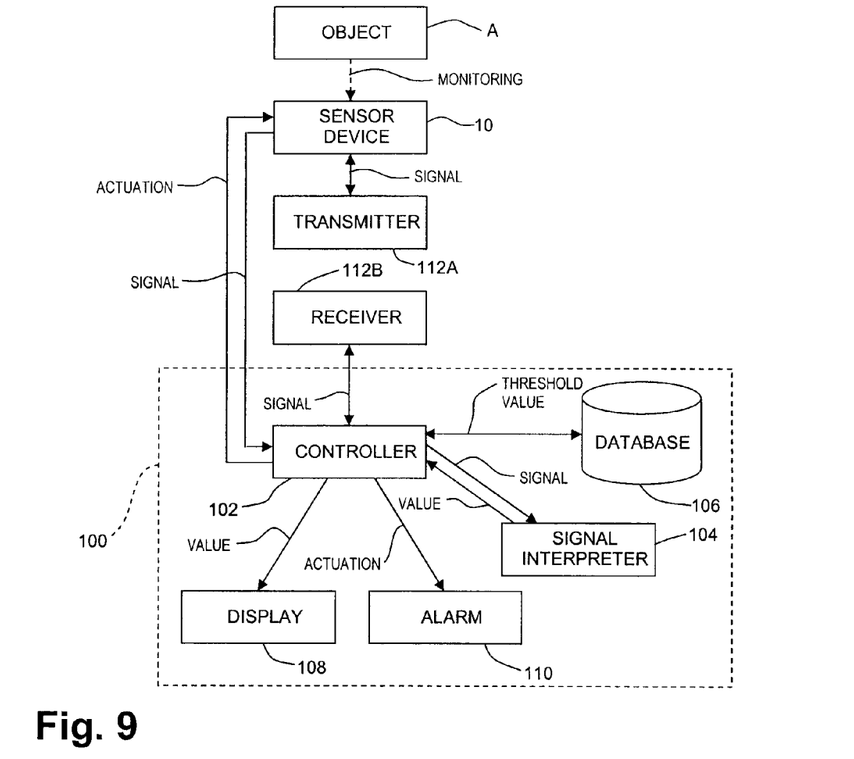
FIG. 9 is a block diagram of a sensor monitoring system as used with the sensor device of FIG. 1.

Referring to FIG. 9, the sensor device 10 (or alternatively, any one of sensors 10A-10D) is shown as being used with a sensor monitoring system 100. The sensor monitoring system 100 has a controller unit 102 (e.g., a processor) that operates the system 100 and its components: a signal interpreter 104, a database 106, a display unit 108 and/or an alarm 110.

In one embodiment, the system 100 is wired to the sensor device 10. The system 100 actuates the sensor device 10 and receives signals from the sensing components 12 (FIG. 1), as a function of the deformations sensed by the components 12 (FIG. 1).

The system 100 has a signal interpreter 104 that interprets the signals so as to provide a value associated with the deformation. Accordingly, the signal interpreter 104 converts an electrical signal (e.g., voltage) into a numerical value whose magnitude is a function of the intensity of the electrical signal.

A database 106 is provided within the controller unit 102, and stores information to be used in combination with the values calculated by the signal interpreter 104. For instance, the database 106 may be used to store calibration data relating the electrical signal intensity to the numerical values calculated by the signal interpreter 104. As another example, the database 106 may store threshold data related to the deformation sensed by the sensor device 10, such as a maximum deformation allowed.

The display unit 108 displays the values related to the deformation sensing, as well as other associated data. The information displayed by the display unit 108 may be in the form of numerical values, go/no go indications, threshold limits, etc.

An alarm 110 may also be provided to produce an audible or optical alarm signal if the deformations measured are above given thresholds (e.g., in the form of warning lights).

Accordingly, the sensor monitoring system 100, with which the sensor device 10 is used in any of its embodiments (10, 10A-10D), may perform functions as alarm, activate relays, provide digital reading, emit warning signals.

According to another embodiment, the sensor device 10 is connected to a transmitter 112A, whereas the sensor monitoring system 100 has a receiver 112B, receiving signals from the transmitter 112A. By the use of wireless technology, the sensor device 10 can be positioned remotely from the sensor monitoring system 100, or without bulky wires in mechanisms. For example, the sensor monitoring system 100 with wireless technology is provided by Massload™ Technologies, with the product "Wireless Sensor and Scale Interface". Sensor devices 10 may share a common transmitter 112A. The sensor device 10 may be equipped with its independent energy source, such as a battery (e.g., rechargeable using solar energy).

Figure 10:
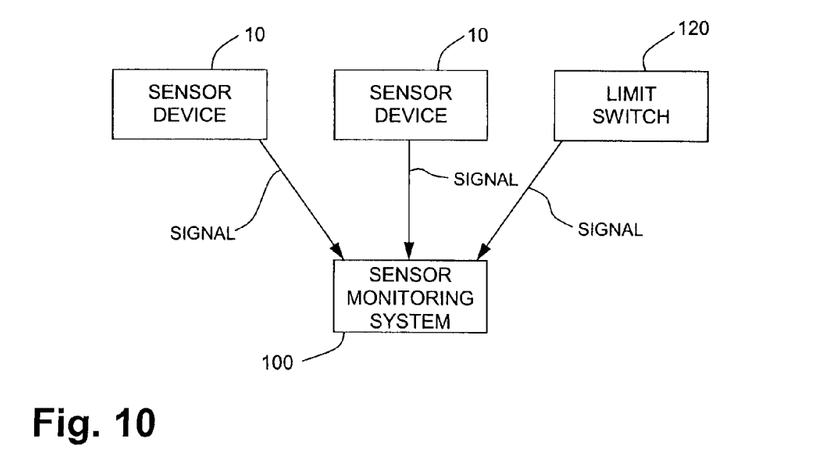
FIG. 10 is a block diagram of the sensor monitoring system of FIG. 9, as used with a plurality of sensor devices.

Referring to FIG. 10, it is illustrated that numerous sensor devices 10 (or 10A-10D) can be used with a single sensor monitoring system 100. Moreover, a limit switch 120 is shown in FIG. 10. The limit switch 120 may be used to modify a threshold value, as will be described hereinafter.

Depending on the nature of the use of the sensor device, it may be required to provide a casing that will completely enclose the exposed portions of the sensor device once the latter is installed on a surface of a structural member. Accordingly, the sensor device can be isolated from moisture, dust, water.

The sensor devices 10, 10A to 10D are designed to monitor the pressure, the strain, the stress, the overload, the fatigue level, and the strength of any solid structure. The structural member or solid structure can be resting on the ground or can be supported in another way, and may be of any solid material. Any suitable transducer configuration can be used for the interpretation of the strain picked up by the strain gauges/sensing components 12.

The sensor devices 10, 10A to 10D can be used individually or simultaneously in a plurality of structures. More particularly, but not exclusively, bridges, tunnels, dams, earthquake detection systems, landslide detection systems, silos, tanks, reservoirs, roofs, railways, subways, foundations, floors, walls, nuclear plants, industrial chimneys, high-rise buildings and towers, industrial signs, cranes, high-rise posts for cable carts, power lines and amusement parks, and involve the sensor devices of the present invention.

According to one embodiment, the sensor device is used with a fork lift, in combination with the sensor monitoring system 100. More specifically, the sensor devices 10 are provided on each side of the forks so as to sense deformation of the forks related to the lifting/supporting of the load. The sensor devices 10 are preferably provided on the vertical arms interfacing the forks to the mast, or any other suitable position (such as the sides of the fork). By positioning the sensors on the vertical arms or between the load and the vertical arm, the lever effect of a load on the forks will be sensed by the sensor devices 10. Such a positioning increases the accuracy of the readings calculated by the sensor monitoring system 100.

The higher the mast supports a load, the greater the risk is of tipping over of the fork lift vehicle. However, if the sensor devices 10 are provided on the fork lift, their readings will be independent of the height of the load. Accordingly, the configuration illustrated in FIG. 10 is suited to adjust the threshold as a function of the height of the load, for instance, by having the limit switch 120 triggered by the mast of the fork lift being extended beyond a threshold height. In such a configuration, the limit switch 120 would indicate to the sensor monitoring system 100 that the deformation threshold should be lowered.

It is preferred to use wireless technology with the fork lift, as otherwise pulleys or like mechanisms would be required to manage the wires extending along the mast.

The invention claimed is:

1. A sensor device comprising:
a sensing component adapted to be connected to a monitoring system to send signals associated with deformation of a structural member, the sensor component being at least one strain gage adapted to be bonded to a surface of the structural member;
a double-sided tape having a first adhesive surface adapted to be adhered to the surface of the structural member to be monitored, with the at least one strain gage being positioned between the tape and the surface of the structural member, and a second adhesive surface adapted to adherently support components associated with the sensing component; and
a backing sheet temporarily connected to the first adhesive surface to protect the first adhesive surface and the at least one strain gage, the at least one strain gauge being between the backing sheet and the first adhesive surface whereby the at least one strain gauge is exposed when the backing sheet is removed from the first adhesive surface.

2. The sensor device according to claim 1, wherein the at least one strain gage has a conductive surface against the tape.

3. The sensor device according to claim 1, wherein a structural component is adhered to the second one of the adhesive surfaces so as to support components associated with the sensing component for interface with a monitoring system.

4. The sensor device according to claim 1, wherein a structural component connected to the tape so as to support components associated with the sensing components for interface with the monitoring system.

5. The sensor device according to claim 4, wherein the structural component is a casing accommodating the components associated with the sensing components for interface with the monitoring system.

6. The sensor device according to claim 5, wherein the casing has a rounded geometry, such that the sensor device is adapted to be mounted against a rounded surface of the structural member.

7. The sensor device according to claim 5, wherein the casing has a standard wall-mount telephone jack associated with the sensing component so as to be adapted to receive a telephone plug from the monitoring system, and the tape has two said adhesive surface, with a first one of the adhesive surface adapted to adhere to the surface of the structural member, and a second one of the adhesive surfaces adapted to adherently support the standard wall-mount telephone jack.

8. The sensor device according to claim 1, wherein the sensing component is at least one foil strain gage.

9. The sensor device according to claim 4, further comprising an interface component on the structural component, the interface component being connected to the sensing components for interface with the monitoring system.

10. The sensor device according to claim 4, further comprising holes in register in the structural component and the tape for lead wires of the sensing component to pass therethrough.

11. The sensor device according to claim 4, wherein the structural component supports a built-on reservoir dispensing said adhesive.

12. The sensor device according to claim 4, wherein the structural component supports a grinding surface to clean the surface of the structural member.

13. A sensor device and monitoring system combination comprising:
at least one sensor device having according to claim 1; and
a monitoring system connected to the sensor device to receive signals associated with a deformation of the structural member, the monitoring system comprising a signal interpreter to produce a value associated to said deformation, and an interface to produce a user output with said value.

14. The combination according to claim 13, wherein the interface is a display unit displaying a numerical value as said user output associated to said deformation.

15. The combination according to claim 13, wherein the interface is an alarm indicating that said value is above a given threshold.

16. The combination according to claim 13, wherein the sensor device further comprises a transmitter and the monitoring system comprises a receiver for wireless communication between the sensor device and the transmitter.

17. The combination according to claim 13, further comprising two of said sensor device for one said monitoring system.

18. The combination according to claim 13, further comprising a limit switch connected to the monitoring system, the limit switch being triggered to activate a threshold, with the signal interpreter comparing the threshold to said value associated to said deformation.

19. The combination according to claim 13, wherein the at least one strain gage is a foil strain gage, and a side of the strain gage from which lead wires project is against the adhesive surface of the tape.

* * * * *